Jan. 22, 1935.   H. N. WADE   1,989,030
DISPENSING SYSTEM FOR VOLATILE LIQUIDS
Filed Dec. 4, 1933
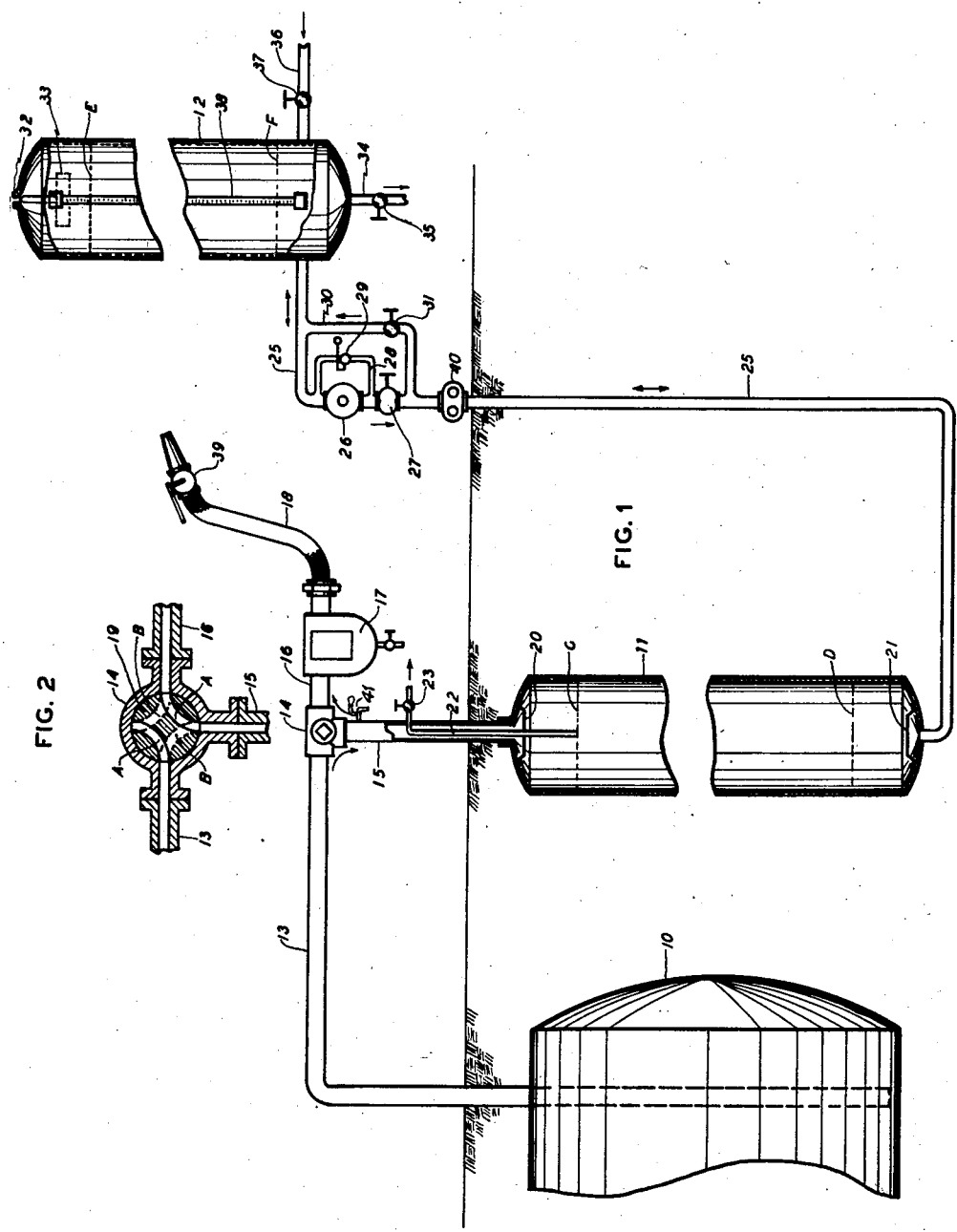
HENRY N. WADE
INVENTOR
ATTORNEY Patented Jan. 22, 1935

1,989,030

UNITED STATES PATENT OFFICE 1,989,030

DISPENSING SYSTEM FOR VOLATILE LIQUIDS

Henry N. Wade, Los Angeles, Calif., assignor to Parkhill-Wade, Incorporated, Los Angeles, Calif., a corporation of California Application December 4, 1933, Serial No. 700,784

7 Claims. (Cl. 221—100)

The object of my invention is to provide a safe, rapid, and convenient apparatus for delivering accurately measured quantities of liquids which boil or rapidly evaporate at atmospheric pressure and temperature.

Light hydrocarbons such as liquefied butane are now coming into extended use as fuel for truck and other heavy engines. As butane boils at atmospheric pressure at materially below normal atmospheric temperatures, it is difficult to gauge in the customary manner as it must be retained under pressure. Attempts to meter it have also proven unsuccessful by reason of excessive slip and of gas binding in the meter.

The apparatus below described permits the rapid transfer and the accurate measurement of any desired quantity while maintaining sufficient pressure to prevent ebullition or evaporation and without passing the volatile liquid through any pump, meter or other device having moving parts.

In the attached drawing Fig. 1 illustrates the complete system, partly in elevation and partly in section, while Fig. 2 shows the arrangement of parts in the three-way cock indicated at 14 in Fig. 1.

Referring to the drawing, 10 indicates an end of a storage tank in which a supply of the liquid is maintained under pressure. 11 is a transfer tank and 12 a measuring tank. Tanks 10 and 11 may desirably be buried, for the sake of safety, but this is not essential to the invention, nor is the location of tank 12 at a level higher than that of tank 11.

A pipe 13 is led from the lower portion of tank 10 into a T connection 14 from which a branch pipe 15 leads into the top of tank 11 and a branch 16 is provided with (an optional) filter or strainer 17 and a flexible delivery tube 18.

The T connection shown in Fig. 1 is in the form of a three-way cock, the arrangement of the parts being as detailed in Fig. 2. With the parts in the position B—B, pipes 13 and 15 are in communication and the discharge pipe 16 is blanked off, while if the plug 19 is rotated until the parts are in the position A—A, communication between tanks 10 and 11 is shut off and the latter is open to the delivery tube 18. The three-way cock shown is suitable and convenient, but three single valves, one in each branch pipe, can be used if preferred.

Tank 11 is desirably provided with two internal baffles 20 and 21, to prevent turbulence in its contents while filling or discharging; a bleeder pipe 22 provided with a valve 23 for fixing a predetermined upper liquid level in the tank, and an air bleeder 41 located as close to the T as possible.

The lower end of tank 11 is connected with the corresponding end of tank 12 by means of a pipe 25 in which is interposed a pump 26 adapted to handling water, and a valve 27 on the discharge side of the pump. Any preferred type of pump, for example a rotary vane pump, may be used and, if power driven, should be provided with a bypass 28 and a weighted relief valve 29 to prevent damage in case a discharge valve should be closed with the pump in operation. Around both pumps should be placed another bypass 30 provided with a manual valve 31.

Tank 12 is provided at its upper end with an air vent 32 and preferably with a float valve 33 to prevent water from overflowing. It is also provided with a water drain pipe 34 controlled by a valve 35 and with a filling pipe 36 connected to any convenient water supply and controlled by a valve 37. The tank is also provided with a gauge glass 38 which should be accurately graduated in gallons or other preferred unit of volume measurement, with reference to the contents of the tank.

The described apparatus is used in the following manner. Tank 12 is first filled with water to any height within the range of the gauge glass by opening valve 37, valves 27 and 31 being closed. Then opening either valve 27 or valve 31 and also air bleeder 41, sufficient water is pumped or gravitated through pipe 25 to fill this pipe and to raise the water level in tank 11 to some preferred limit, such as indicated at D.

Valves 27 and 31 are now closed, valve 41 remaining partially open to permit the escape of air and vapor, cock 14 is turned to the B—B position, and the liquid to be dispensed is forced, by its own vapor pressure, from tank 10 into tank 11 through pipes 13 and 15, until this tank and pipe 15 are filled, at which time liquid will appear at valve 41, which is then closed.

Tank 12 is now refilled with water, and its level in the gauge glass carefully noted. Cock 14 is turned into the A—A position, and enough water is pumped from tank 12 into tank 11 to cause the volatile liquid to appear at the end of the dispensing tube 18, which may desirably be provided with the usual end-valve 39 to prevent loss of liquid from the flexible tube. Valve 27 is then closed, the plug turned again to the A—A position, and water forced back through partly opened valve 31 until the water reaches the exact height in the gauge glass to which it was last refilled, which height should be near the upper end of the glass.

The entire system is now filled with liquid, i. e., with the volatile liquid above the level D in tank 11, and with water below that level, and is ready to be used in the delivery of measured quantities of the volatile liquid, the above operations being preliminary to such use.

In order to effect a delivery, the plug is turned to the A—A position, the vapor pressure of the liquid being held by valve 39 at the end of the tube. Pump 26 is started, bypassing through relief valve 29. The water level E in tank 12 is noted as before, valve 28 is opened and volatile liquid is withdrawn from tank 11 through valve 39 until the lowering of the water level in tank 12, as observed in the gauge glass, indicates that the desired quantity has been withdrawn. Only water passes through the pump and, as sufficient pressure is maintained on the discharge side of the pump to prevent ebullition of the volatile liquid, the water withdrawn from tank 12 will obviously exactly equal in bulk the volatile liquid displaced from tank 11. The quantity which may be delivered in one operation is limited by the capacity of tank 12, observable in the gauge glass, and it is desirable that tanks 11 and 12 be of the same capacity, or at least that they be so proportioned that the capacity between levels C and D in tank 11 be equal to that between levels E and F in tank 12.

The delivery being completed, valve 27 is closed and the pump may be stopped unless another delivery is to be made immediately. The plug is now turned into the B—B position and valve 31 opened, thus permitting the vapor pressure in tank 10 to displace water from tank 11 and return it to tank 12, reestablishing water level E and preparing the system for another delivery. Operation is simplified by returning the water each time to the same level, though this not essential as the difference between the readings before and after the delivery affords an accurate measurement in each case.

Tank 12 and its equipment should be carefully guarded against accidental loss of water, which would of course introduce a corresponding error if it occured while making a delivery. Slow evaporation from tank 12 and other gradual losses may be made up at considerable intervals by introducing water through valve 37.

Such losses may be discovered by means of the drop pipe 22 and valve 23. With the stopcock in the B—B position, water is pumped from tank 12 into tank 11 until it appears at the valve, indicating that it has reached level C. The water gauge on tank 12 is then noted and, if below the normal minimum, a make-up supply is introduced, or if above that level, water is withdrawn through drain valve 37.

If preferred, the gauge glass may be dispensed with and a piston-type or other form of displacement meter placed in pipe 25 as indicated at 40. The meter should be so placed as to handle water only, not the volatile liquid.

In place of pump 26 and its connections, air under pressure and controllably introduced into the top of tank 12, as at 32, may be used to force the displacement water from tank 12 to tank 11.

While I have referred throughout to the use of water as a displacing liquid, it will be understood that I may use for this purpose any liquid heavier than and immiscible with the displaced liquid, provided that it be inert and noncorrosive to metals.

It will also be obvious that a displacing liquid lighter than that to be displaced may be utilized by merely reversing the position of the top and bottom connections to tank 11.

I claim as my invention:

1. Apparatus for dispensing hydrocarbons boiling below atmospheric temperature which comprises: a closed storage tank and a closed transfer tank adapted to retain said hydrocarbons under a pressure equal to their vapor pressure; conduit connecting the top of said transfer tank with the lower part of said storage tank; a water supply tank having its lower end at a materially higher level than the upper end of said transfer tank; conduit connecting the lower end of said supply tank with the lower end of said transfer tank; a discharge pipe communicating with the top of said transfer tank; valve means for directing said hydrocarbons from said storage tank into said transfer tank and from said transfer tank into said discharge pipe; means for transferring water under a pressure greater than said vapor pressure from said supply tank into said transfer tank to displace said hydrocarbons therefrom, and means for measuring the amount of water so transferred.

2. Apparatus for dispensing hydrocarbons boiling below atmospheric temperature which comprises: a closed storage tank adapted to retain said hydrocarbons under a pressure equal to their vapor pressure; a relatively long and narrow transfer tank vertically arranged; a conduit connecting the top of said transfer tank with the lower part of said storage tank; a relatively long and narrow water supply tank vertically arranged; a conduit connecting the lower end of said supply tank with the lower end of said transfer tank; a discharge pipe communicating with the top of said transfer tank; valve means for directing said hydrocarbons from said storage tank into said transfer tank and from said transfer tank into said discharge pipe; means for transferring water from said supply tank into said transfer tank to displace said hydrocarbons therefrom, and a gauge glass mounted on said supply tank to measure the amount of water so transferred.

3. Apparatus for dispensing hydrocarbons boiling below atmospheric temperature which comprises: a closed storage tank and a closed transfer tank adapted to retain said hydrocarbons under a pressure equal to their vapor pressure; a conduit connecting the top of said transfer tank with the lower part of said storage tank; a discharge conduit branched from said connecting conduit; a three-way cock interposed in said connecting conduit and communicating with said discharge conduit whereby said hydrocarbons may be directed from said storage tank into said transfer tank and from said transfer tank into said discharge conduit; means for introducing water into said transfer tank to displace hydrocarbons therefrom into said discharge conduit, and means for measuring the water so introduced.

4. Apparatus for dispensing hydrocarbons boiling below atmospheric temperature which comprises: a closed storage tank and a closed transfer tank adapted to retain said hydrocarbons under a pressure equal to their vapor pressure; a conduit connecting the top of said transfer tank with the lower part of said storage tank; a discharge conduit communicating with the top of said transfer tank; valve means in both said conduits; a water supply tank; a water conduit connecting the lower end of said supply tank with the lower end of said transfer tank; a pump interposed in said water conduit and arranged to transfer water from said supply tank to said transfer tank to displace hydrocarbons therefrom; means for measuring the amount of water so transferred; a bypass around said pump to permit the return of said water from said transfer tank to said supply tank, and a valve in said bypass.

5. Apparatus for dispensing hydrocarbons boiling below atmospheric temperature which comprises: a closed storage tank and a closed transfer tank adapted to retain said hydrocarbons under a pressure equal to their vapor pressure; a liquid-level indicating device comprising a tube passing through the upper end of said transfer tank, terminating within said transfer tank near the upper end thereof and provided with a valve exterior to said tank; a conduit connecting the top of said transfer tank with the lower part of said storage tank; a discharge conduit communicating with the top of said transfer tank; valve means in both said conduits; means for introducing water into the lower end of said transfer tank to displace said hydrocarbons therefrom, and means for measuring the amount of water so introduced.

6. The method of dispensing hydrocarbons boiling below atmospheric temperature which comprises: maintaining a body of said hydrocarbons under a pressure equal to their vapor pressure; transferring a portion of said hydrocarbons from said body into a closed vessel by means of said vapor pressure; maintaining a retained body of water; transferring water from last said body into said vessel under a pressure greater than said vapor pressure to displace a portion of said hydrocarbons therefrom; measuring the quantity of water so transferred, and returning said water from said vessel to said water body by means of the vapor pressure of said hydrocarbons.

7. The method of dispensing hydrocarbons boiling below atmospheric temperature which comprises: maintaining underground a liquid body of said hydrocarbons under a pressure equal to their vapor pressure; transferring a portion of said hydrocarbons from said body into an underground closed vessel by means of said vapor pressure; maintaining aboveground a retained body of water; transferring water from last said body into said vessel under a pressure greater than said vapor pressure to displace a portion of said hydrocarbons and raise said portion aboveground; measuring the quantity of water so transferred, and returning said water from said vessel to said water body by means of the vapor pressure of said hydrocarbons.

HENRY N. WADE.